United States Patent
Chikazawa et al.

(10) Patent No.: US 7,859,741 B2
(45) Date of Patent: Dec. 28, 2010

(54) VARIABLE IRIS USING CHARGED OPAQUE PARTICLES

(75) Inventors: Yoshiharu Chikazawa, Yokohama (JP); Toshihiko Gotoh, Tokyo (JP)

(73) Assignee: Thomson Licensing, Boulogne-Billancourt (FR)

( * ) Notice: Subject to any disclaimer, the term of this patent is extended or adjusted under 35 U.S.C. 154(b) by 698 days.

(21) Appl. No.: 11/708,888

(22) Filed: Feb. 20, 2007

(65) Prior Publication Data

US 2007/0205671 A1 Sep. 6, 2007

(30) Foreign Application Priority Data

Mar. 2, 2006 (EP) .................................. 63000180

(51) Int. Cl.
*G02B 26/00* (2006.01)
*G03G 17/04* (2006.01)
*G09G 3/34* (2006.01)
*G02F 1/133* (2006.01)

(52) U.S. Cl. .......................... 359/296; 430/32; 345/107; 349/33

(58) Field of Classification Search ................. 359/296; 430/31–32; 345/107; 349/33
See application file for complete search history.

(56) References Cited

U.S. PATENT DOCUMENTS

| | | | | |
|---|---|---|---|---|
| 6,639,580 | B1 * | 10/2003 | Kishi et al. ................ | 345/107 |
| 2004/0145696 | A1 | 7/2004 | Oue et al. | |
| 2005/0104844 | A1 * | 5/2005 | Nakai et al. ................ | 345/107 |
| 2007/0126693 | A1 * | 6/2007 | Johnson et al. ............. | 345/107 |
| 2007/0296690 | A1 * | 12/2007 | Nagasaki .................... | 345/107 |

FOREIGN PATENT DOCUMENTS

WO  WO 2004/019125 A  3/2004

OTHER PUBLICATIONS

Patent Abstracts of Japan vol. 2003, No. 12, Dec. 5, 2003 & JP 2004 012906 A (Sanyo Electric Co. Ltd.), Jan. 15, 2004 *abstract* *figure 1,2,4* figures 5-8*figure 10*.
Patent Abstracts of Japan vol. 2003, No. 12, Dec. 5, 2003 JP 2004 061833 A (Canon Inc.), Feb. 26, 2004 *abstract* figures 1,4*.
Search Report dated May 3, 2006.

* cited by examiner

*Primary Examiner*—Scott J Sugarman
*Assistant Examiner*—Dawayne A Pinkney
(74) *Attorney, Agent, or Firm*—Robert D. Shedd; Jeffrey M. Navon

(57) ABSTRACT

The present invention relates to a variable iris using charged opaque particles, and to a method for operating such a variable iris.

According to the invention, the variable iris has a first transparent substrate and a second transparent substrate, which are separated by one or more ribs to form a cell confining charged opaque particles, the first transparent substrate being provided with at least a first electrode and a second electrode both being adapted to be connected to a voltage source for acting on the charged opaque particles, and at least a third electrode adapted to be connected to the voltage source for acting on the charged opaque particles, the voltages applied to the first electrode, the second electrode, and the third electrode being controllable to have the same or opposite signs. The variable iris further has a pulse driver for applying voltage pulses to the electrodes.

9 Claims, 8 Drawing Sheets a)

b)

VARIABLE IRIS USING CHARGED OPAQUE PARTICLES

This application claims the benefit, under 35 U.S.C. §119, of European Patent Application 063000180.4 filed 2 Mar. 2006.

FIELD OF THE INVENTION

The present invention relates to a variable iris using charged opaque particles, and to a method for controlling such a variable iris.

BACKGROUND OF THE INVENTION

Nowadays lots of digital (still and movie) cameras are available on the market. Different kinds of diaphragms for controlling the amount of light falling onto a photodetector are utilized in lens optics. The most widely used diaphragm is the iris diaphragm. However, this mechanical iris diaphragm has a number of disadvantages. It is not suitable for small lens assemblies, as for example in current small digital cameras, due to the necessary size of the mechanical components. In addition, it is not possible to control the shape of the aperture. As springs and a mechanical movement are used, the iris diaphragm needs maintenance. Finally, this type of diaphragm has a relatively slow response.

To circumvent at least some of the above problems, electronic diaphragms based on liquid crystal elements have been proposed. However, liquid crystal elements have a rather low optical transmissivity and are not suitable for all applications.

As a further alternative, a variable iris using small charged opaque particles (electrophoretic particles) has been developed. According to this approach the iris aperture pattern is adjusted by controlling the positions of the opaque particles with electrodes. This type of variable iris has a higher transmissivity of the aperture compared than a liquid crystal type iris.

For example, JP 2004-012906 describes a light control element consisting of electrophoretic particles confined between two substrates. A plurality of ring shaped electrodes is used for moving the particles to a desired location between the substrates. In this way a variable aperture is formed.

Similarly, JP 2004-061832 describes an electrophoretic light quantity adjusting element. Opaque particles confined between two transparent electrodes, which are surrounded by respective opaque electrodes, are used for controlling the quantity of light impinging on a CCD detector. By applying a voltage to the electrodes the particles are moved into or out of the aperture formed by the transparent electrodes.

SUMMARY OF THE INVENTION

It is an object of the invention to propose a variable iris having an improved response time.

According to the invention, this object is achieved by a variable iris having a first transparent substrate and a second transparent substrate, which are separated by one or more ribs to form a cell confining charged opaque particles, the first transparent substrate being provided with at least a first electrode and a second electrode both being adapted to be connected to a voltage source for acting on the charged opaque particles, and at least a third electrode adapted to be connected to the voltage source for acting on the charged opaque particles, wherein the voltages applied to the first electrode, the second electrode, and the third electrode are controllable to have the same or opposite signs. For moving the charged opaque particles, which have a first sign, e.g. from the second electrode to the first electrode, a voltage of the first sign is first applied to the second electrode and the first electrode. At the same time a voltage pulse of an opposite sign is applied to the third electrode. Once the particles have moved sufficiently into the inside of the cell, the voltage pulse to the third electrode is switched off and a voltage of the opposite sign is applied to the first electrode. For moving the charged opaque particles from the first electrode to the second electrode, the roles of first and second electrode in the above description are exchanged.

The voltage applied to the third electrode, which is located on the second transparent substrate or on the rib, supports the movement of the charged opaque particles away from the first or second electrode and into the inside of the cell. As both the first and the third electrode are used for setting the variable iris to a fully open state, the response of the iris is very fast, i.e. the iris aperture changes rapidly. This makes it possible to use the variable iris even in camcorder optics. The variable iris according to the invention has a plurality of further advantages. Due to the omission of mechanical actuators the iris can easily be miniaturized. It is, therefore, suitable for small image capturing devices. In addition, the shape of the aperture is maintained even if the size of the open aperture is very small. In contrast, for mechanical iris diaphragms the shape of the aperture is distorted if the size of the open aperture is very small, which leads to a change of the blur pattern. A further advantage is the possibility to achieve any shape of the iris aperture, including a polygonal aperture and a ring-type aperture.

Recently electrophoretic particles having a memory effect have been developed. For example, in "SID '04 (Society for Information Display), Digest of technical papers", pp 133-135 a "Quick response liquid powder display" is disclosed. The particles used for this display have a diameter of less than 10 μm, the response time is less than 0.2 ms. The display has a memory effect. When such electrophoretic particles are used for the variable iris according to the invention, power is only consumed when the particle positions are changed and the power consumption is very low. This is an important aspect for mobile applications.

Preferably, a variable iris according to the invention is used in an image capturing or projection device or an apparatus for reading from and/or writing to optical recording media. Examples of such image capturing devices are digital still or movie cameras or a camera of a mobile phone. Image projection devices include front and rear video projectors. In an apparatus for reading from and/or writing to optical recording media the variable iris is advantageously used for adjusting the diameter of a light to the type of optical recording medium.

BRIEF DESCRIPTION OF THE DRAWINGS

For a better understanding the invention shall now be explained in more detail in the following description with reference to the Figures. It is understood that the invention is not limited to this exemplary embodiment and that specified features can also expediently be combined and/or modified without departing from the scope of the present invention. In the Figures.

DETAILED DESCRIPTION OF PREFERED EMBODIMENTS

Figure 1:
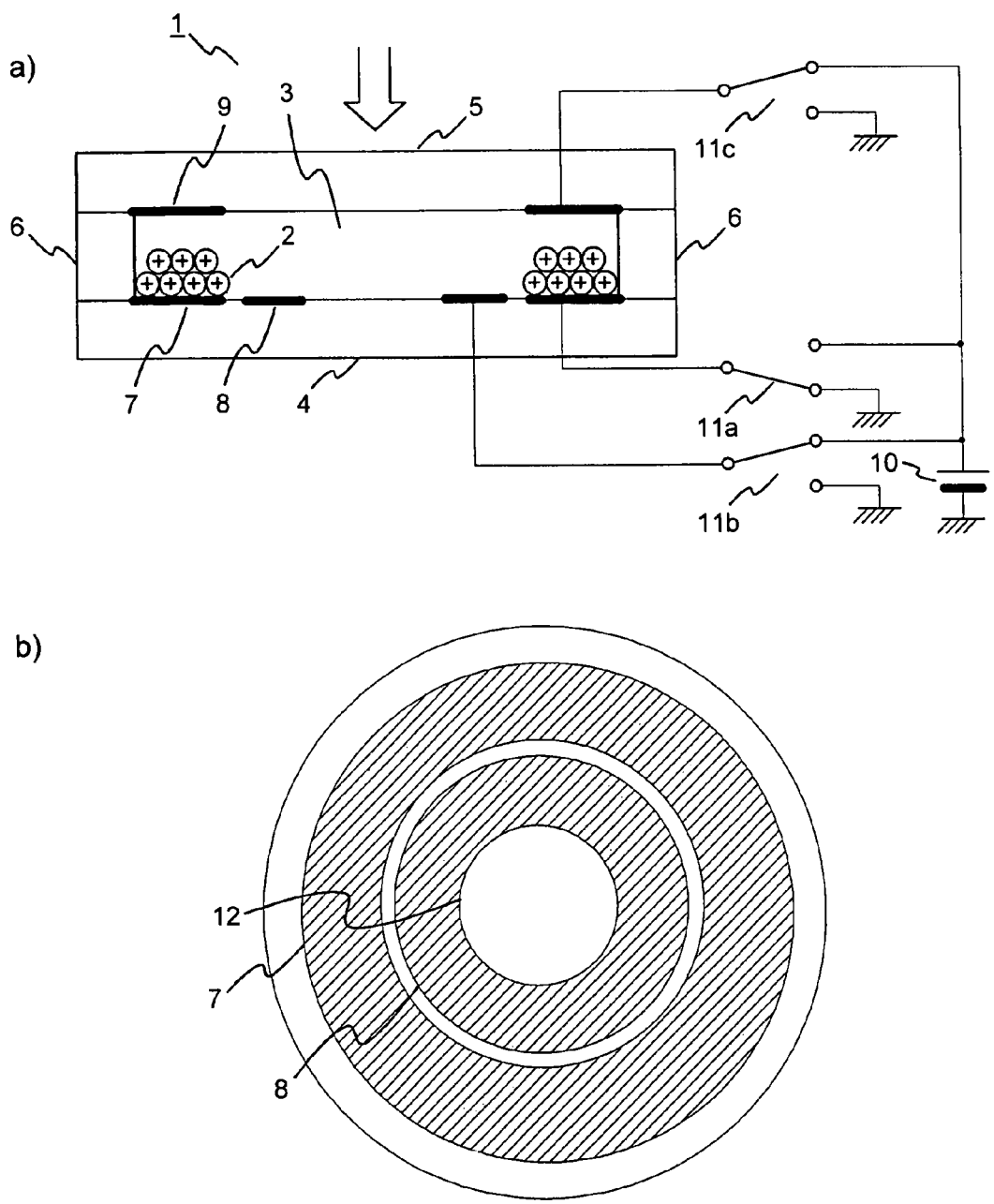
FIG. 1 depicts a side view and a top view of a variable iris according to the invention in an open stated.
Figure 2:
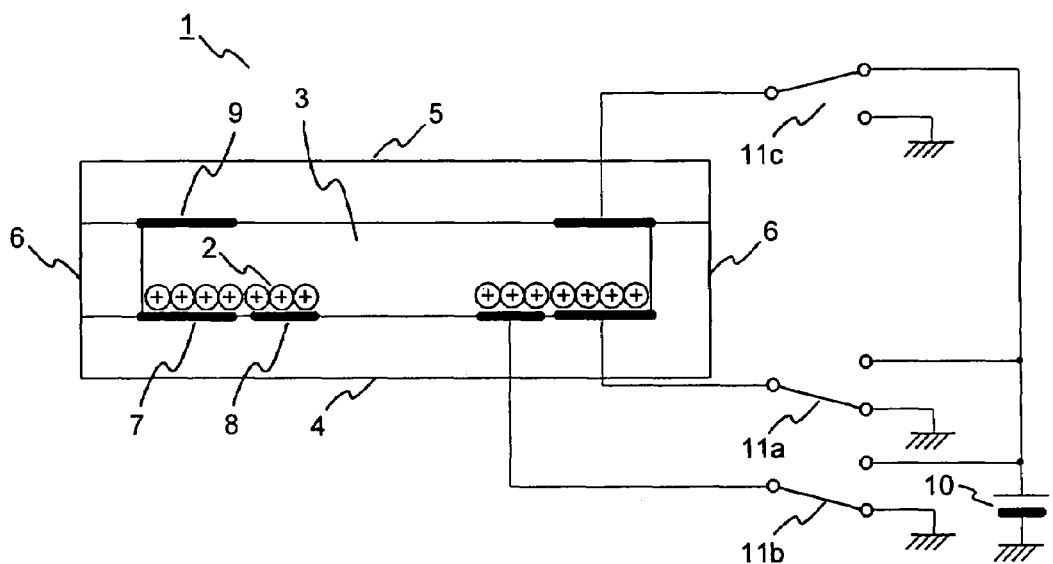
FIG. 2 shows the variable iris in a partially closed state.

FIGS. 1 and 2 show the basic concept of a variable iris 1 according to the invention using electrophoretic particles. FIG. 1a) is a side view, FIG. 1b) a top view of the variable iris 1 in its open state, while FIG. 2 is a side view of the variable iris 1 in its (partially) closed state. As can be seen in FIG. 1a), charged opaque particles 2 are confined in a cell 3 composed of transparent substrates 4, 5 and ribs 6. The cell 3 is filled with a liquid. The charged opaque particles 2 have a positive electric charge. The opaque particles 2 are preferably black or gray particles, as this avoids stray light, but particles 2 with any other color can likewise be used. Transparent ring-shaped electrodes 7, 8, 9 are placed on the transparent substrates 4, 5, namely a first electrode 7 and a second electrode 8 on the bottom transparent substrate 4 and a third electrode 9 on the top transparent substrate 5. The first and second ring-shaped electrodes 7, 8 surround a center transparent zone 12, as depicted in FIG. 1b).

In FIG. 1a), the charged opaque particles 2 are located on the first electrode 7. This status is achieved by applying a ground voltage to the first electrode 7 via a first switch 11a and a positive voltage to the third electrode 9 via a third switch 11c. Incident light, which is indicated by an arrow, passes through the center transparent zone 12 and the second electrode 8. When the second electrode 8 is connected to a voltage source 10 by a second switch 11b, a voltage is applied to the second electrode 8 and some of the particles 2 are moved to the second electrode 8. This is shown in FIG. 2. In this case, incident light passes only through the center transparent zone 12, as the second electrode 8 is covered by the opaque particles 2. The device hence is a bi-stable iris diaphragm, the first electrode 7 and the third electrode 9, which is connectable to the voltage source 10 by the third switch 11c, being used for setting the variable iris 1 to the 'fully open' condition.

In the above example, due to the number of confined particles 2 the first and second electrodes 7, 8 are completely covered by the particles 2 when a voltage is applied. Therefore, the incident light is completely blocked. By reducing the number of particles 2 the attenuation of the incident light can be controlled. Though in FIGS. 1 and 2 the first and third electrode 7, 9 are transparent electrodes, it is likewise possible to make one or both of theses electrodes 7, 9 opaque. However, when the first electrode 7 is transparent, the third electrode 9 is preferably transparent as well. If one or both of the electrodes 7, 9 are opaque, only the area of the second electrode 8 is switchable from transparent to opaque.

Figure 3:
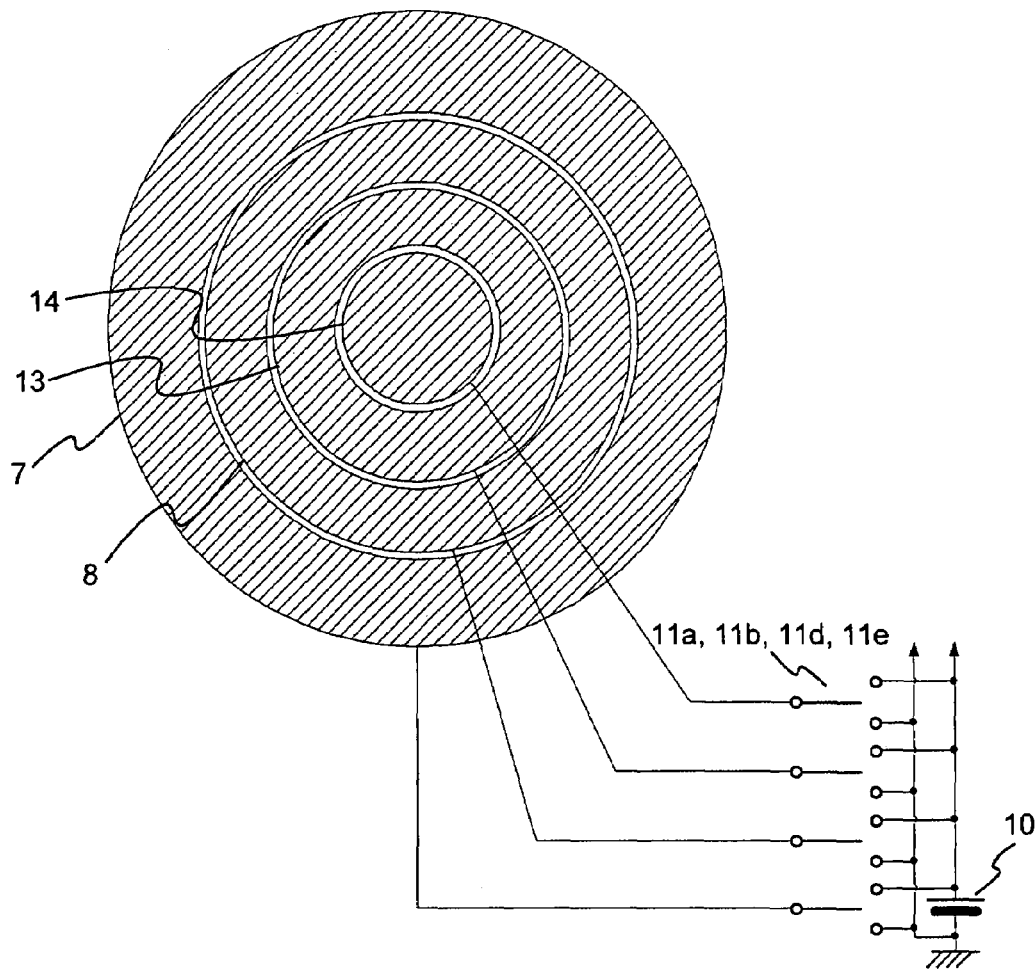
FIG. 3 depicts a variable iris with four ring-shaped electrodes.

In FIGS. 1 and 2 the third electrode 9 has the same size as the first electrode 7. This is, however, not mandatory. If the third electrode 9 is transparent, it may even cover the complete upper substrate 5. In addition, more than two electrodes can be located on the bottom transparent substrate 4. FIG. 3 shows an example of a bottom transparent substrate 4 with four ring-shaped electrodes 7, 8, 13, 14 and corresponding switches 11a, 11b, 11d, 11e. When a voltage is applied to the first electrode 7 and the second electrode 8, the fourth and fifth electrode 13, 14 remain transparent. When a voltage is applied to the first, second and fourth electrode 7, 8, 13, only the fifth electrode 14 remains transparent. If, however, a voltage is applied only to the fifth electrode 14, the first, second hand fourth electrode 7, 8, 13 remain transparent. In this case, the shape of the aperture is a ring.

In the figures only ring- or disc-shaped electrodes are depicted. It is, however, possible to use any type of shape, e.g. a polygon. If rectangular electrodes are used, the blur pattern is basically also rectangular. In this case, if the sides of the rectangular electrodes are parallel to the pixel lines of an image sensor, e.g. a CCD-array, the blur in the transmitted light is also parallel to the pixel lines and can easily be compensated for a captured image. Likewise, the invention is not limited to a cylindrical shape of the cell 3. Other shapes can be used as well, e.g. a cube. For any shape of the cell 3 any shape of the electrodes can be chosen.

Figure 4:
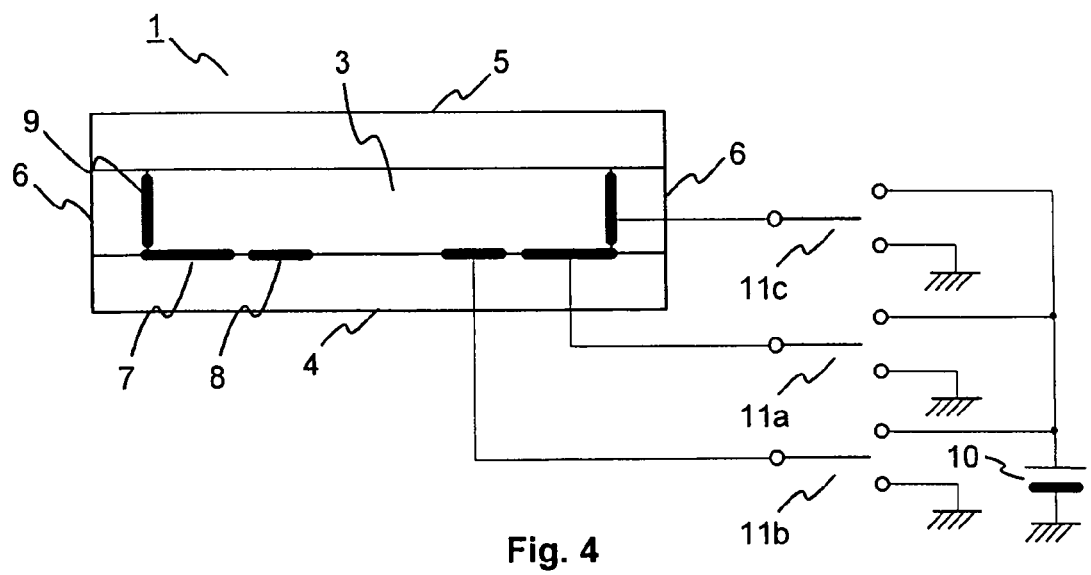
FIG. 4 shows a variable iris with an electrode located on a rib.
Figure 5:
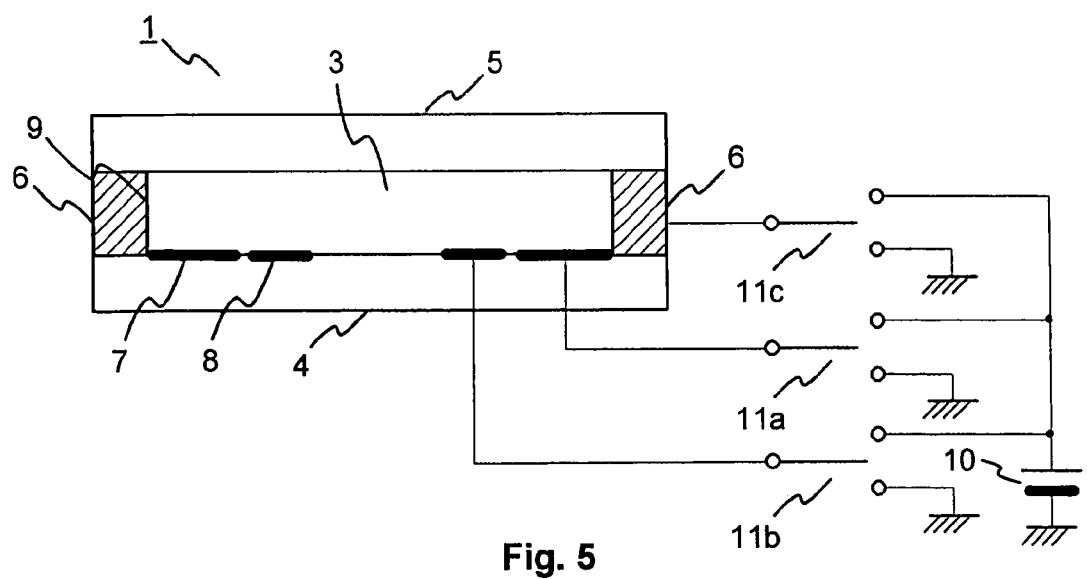
FIG. 5 depicts a variable iris using a rib as an electrode.

FIG. 4 shows an example where the third electrode 9 is not located on the upper transparent substrate 5, but on the rib 6. In this case, when a suitable voltage is applied to the third electrode 9 the charged particles 2 are located on the rib 6 and the variable iris 1 is fully open at the first and the second electrodes 7, 8. When the rib 6 is made of a metal, the rib 6 itself can be used as the third electrode 9. This is depicted in FIG. 5.

Figure 6:
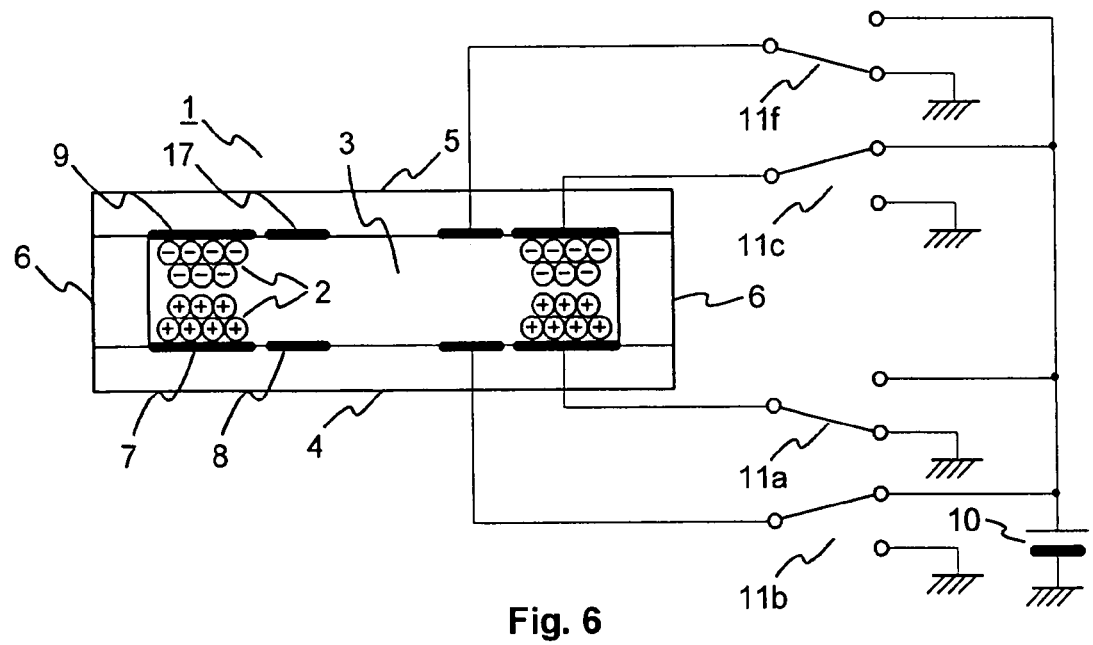
FIG. 6 shows a variable iris using both positively and negatively charged particles.

With reference to FIGS. 1 and 2 it has been stated that the charged particles 2 have a positive electric charge. Of course, it is also possible to use charged particles 2 having a negative electric charge. In this case, the voltages applied to the electrodes need to be reversed. In addition, as shown in FIG. 6, it is possible to confine both positively and negatively charged particles 2 in the cell 3. This neutralizes the total charge in the cell 3. In this case, if no electric field is applied via the electrodes 7, 8, 9, 17 the particles may stick together. However, this effect only occurs after a couple of months due to the limited mobility of the particles 2 in the liquid within the cell 3 and does not constitute a problem for normal use. For the same reason other external forces like gravity or accelerations do not lead to a considerable movement of the particles. However, to avoid long-time effects electric fields may be applied to the cell 3 in regular intervals.

Figure 7:
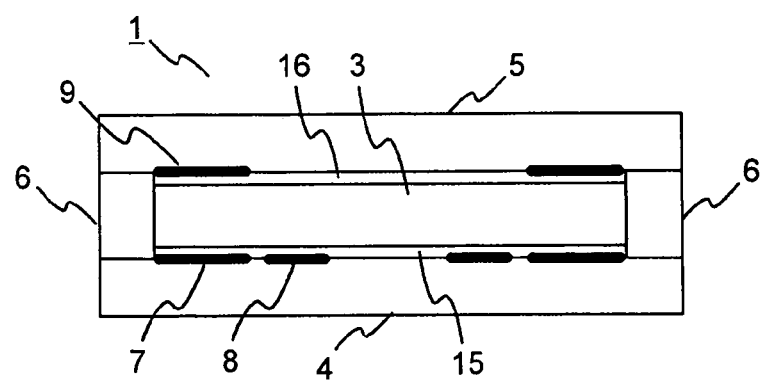
FIG. 7 depicts a variable iris having dielectric layers on the electrodes.

According to a further refinement the electrodes are covered with dielectric layers 15, 16, as depicted in FIG. 7. The dielectric layers 15, 16 help to protect the electrodes from erosion caused by the liquid in the cell 3. In this and the following figures, the voltage source 10 and the switches 11a, 11b, 11d, 11e are not shown.

Figure 8:
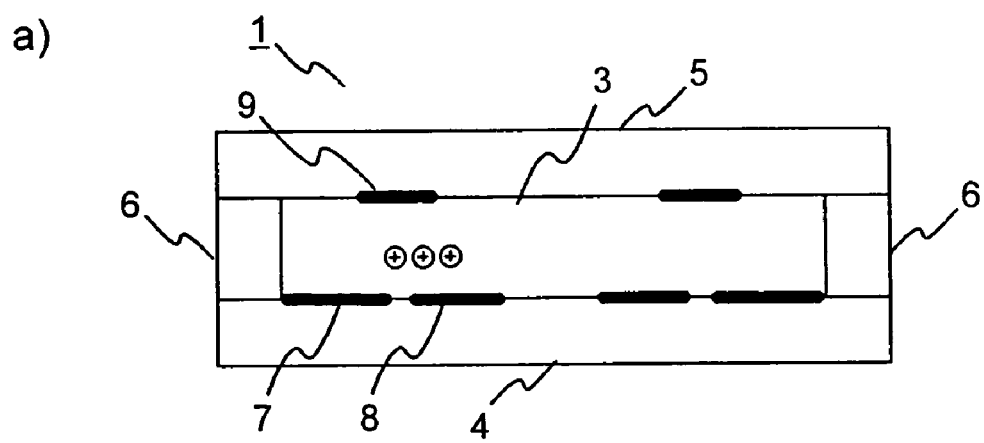
FIG. 8 shows the pulsed operation of a variable iris with three electrodes.
Figure 8:
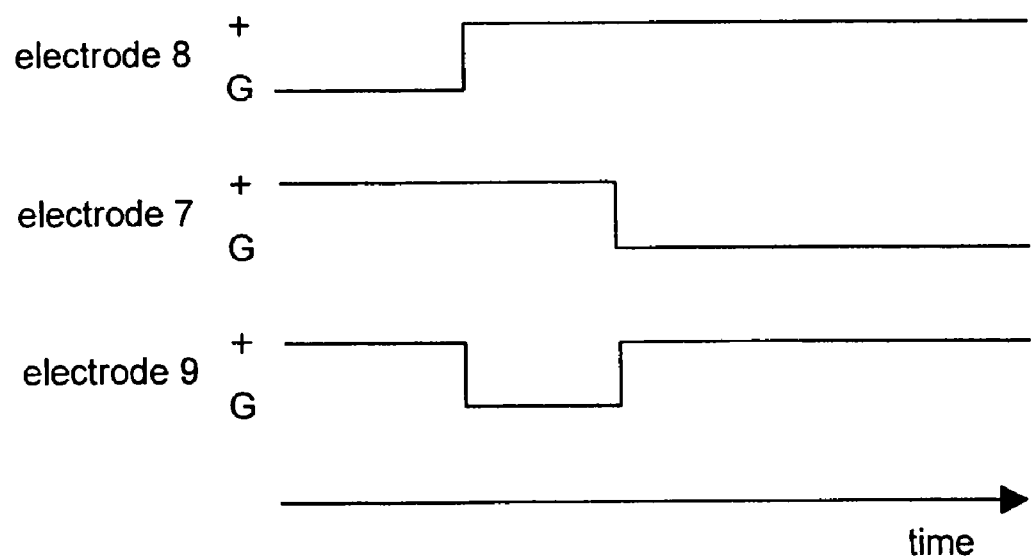

Sometimes the movement of the particles 2 is hampered by friction. In order to reduce the friction, it is preferable to move the particles within the space of the cell 3, not contacting with any surface of the substrates 4, 5, as shown in FIG. 8a). An exemplary timing of the voltages applied to the electrodes to achieve this non-contacting movement is depicted in FIG. 8b) for a variable iris with three electrodes. When the particles 2 are initially located on the second electrode 8, a positive voltage is applied to the third electrode 9 on the upper substrate 5, and a ground voltage is applied to the second electrode 8. In order to move the particles 2 to the first electrode 7, a positive voltage is applied to the second electrode 8, and a ground voltage is applied to the third electrode 9. Just after a short time, when the particles 2 are moving towards the third electrode 9 and are dispersed in the liquid, a positive voltage is applied to this third electrode 9 and a ground voltage is applied to the first electrode 7. Using this 'pulsed' operation of the third electrode 9, the particles 2 are moved without contacting any substrate surfaces.

Figure 9:
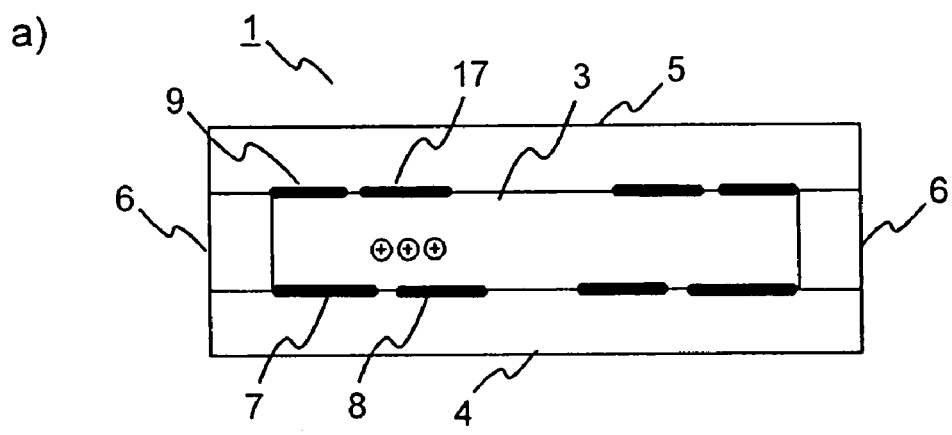
FIG. 9 depicts the pulsed operation of a variable iris with four electrodes.
Figure 9:
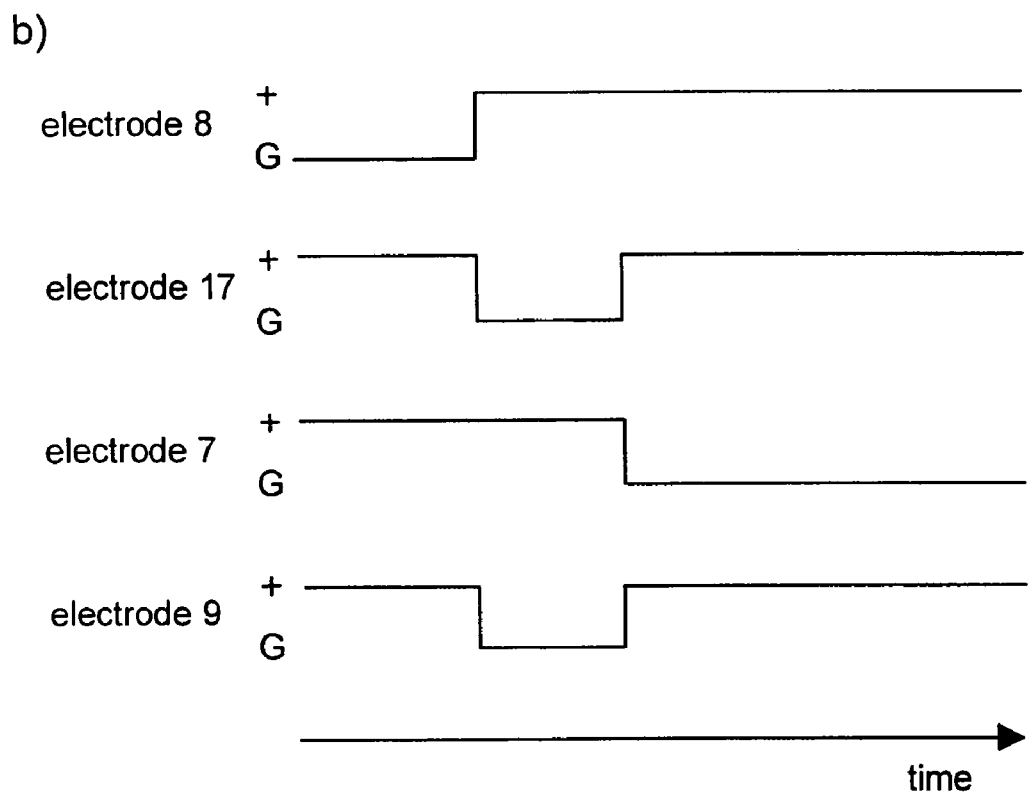
Figure 10:
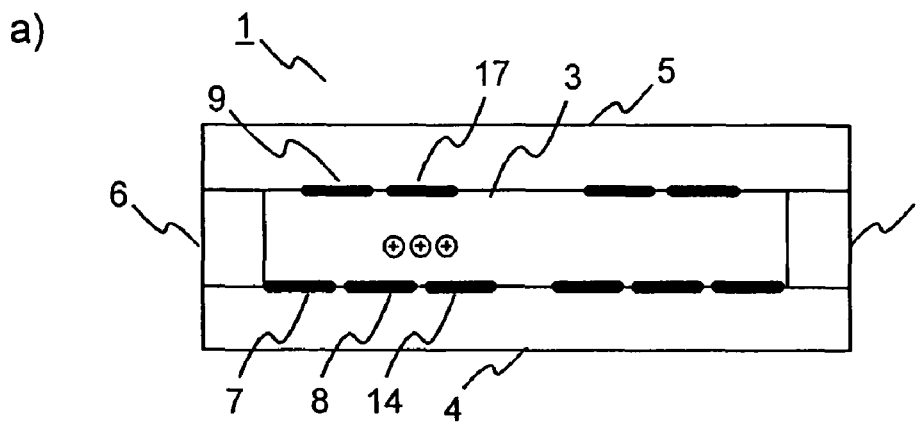
FIG. 10 illustrates the pulsed operation of a variable iris with five electrodes.
Figure 10:
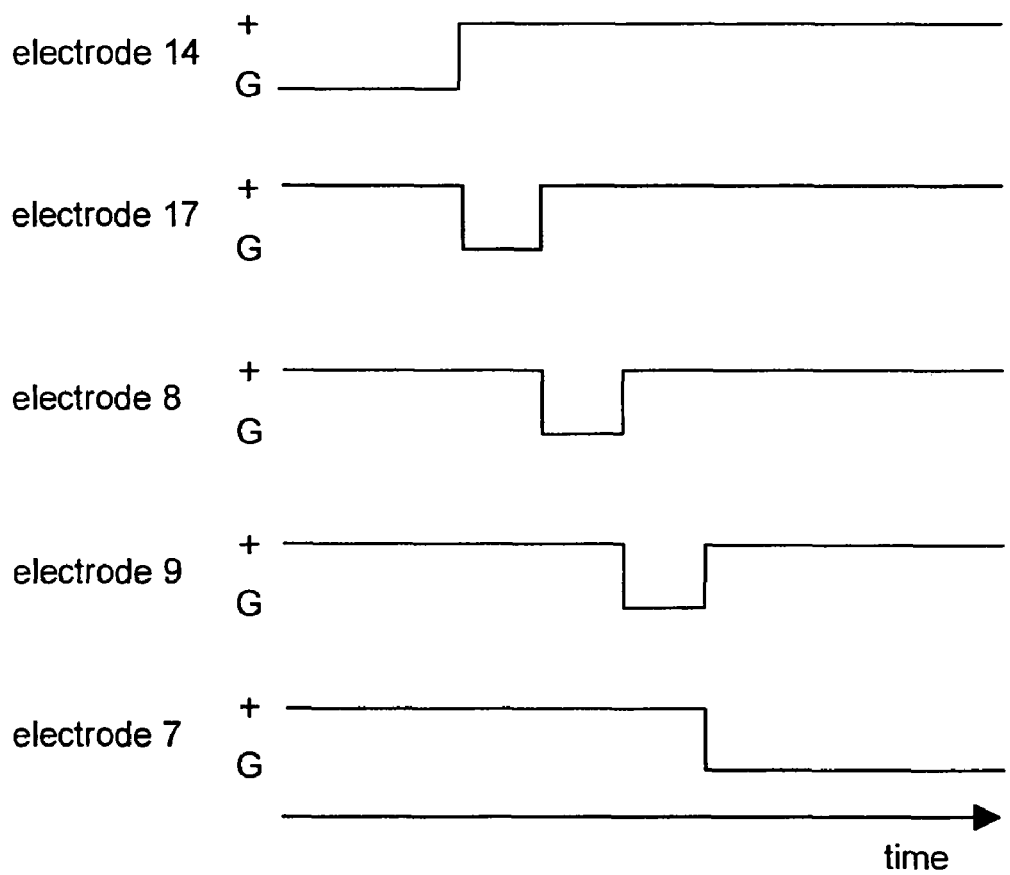
Figure 11:
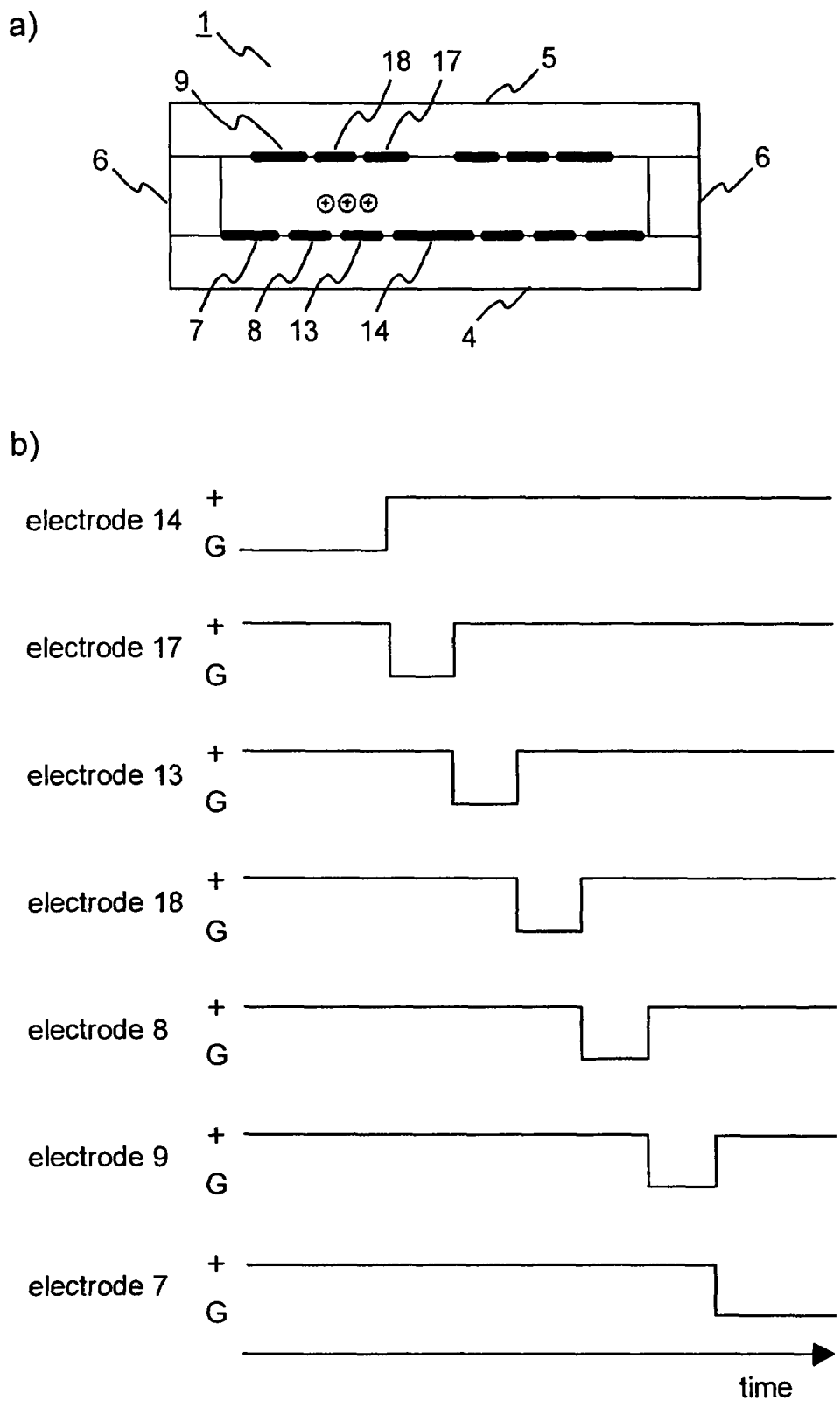
FIG. 11 shows the pulsed operation of a variable iris with seven electrodes.

Of course, more than three electrodes can be arranged in the radial direction. The non-contacting movement of the particles 2 is then achieved by applying similar voltage pulses as the one applied to the third electrode 9. In FIGS. 9 to 11 the pulsed operation of variable irises with four, five, and seven electrodes are illustrated. In FIG. 9, in order to move the particles 2 to the first electrode 7, a positive voltage is applied to the second electrode 8, and a ground voltage is applied to a sixth electrode 17 and the third electrode 9. Just after a short time, when the particles 2 are moving towards the sixth electrode 17, a positive voltage is applied to the sixth electrode 17 and the third electrode 9, and a ground voltage is applied to the first electrode 7. Similarly, in FIG. 10 pulses are applied first to the sixth electrode 17, then to the second electrode 2, and finally to the third electrode 9. Likewise, in FIG. 11 two further electrodes 13 and 18 are employed, to which pulses are applied before applying pulses to the second electrode 2 and the third electrode 9.

In the above examples, the electrodes are located both on the lower and the upper transparent substrates. The pulsed operation of the electrodes can likewise be employed when the rib 6 is used as an electrode.

What is claimed is:

1. Variable iris having a first transparent substrate and a second transparent substrate, which are separated by one or more ribs to form a cell confining charged opaque particles, the first transparent substrate being provided with at least a first electrode and a second electrode both being adapted to be connected to a voltage source for acting on the charged opaque particles, and at least a third electrode and a fourth electrode adapted to be connected to the voltage source for acting on the charged opaque particles, the third electrode being arranged on the second transparent substrate or on the ribs and the fourth electrode being arranged on the second transparent substrate, the voltages applied to the first electrode, the second electrode, the third electrode and the fourth electrode being controllable to have one of at least a first and a second value, wherein it includes a pulse driver for selectively applying voltage pulses to the first electrode, the second electrode, the third electrode, and the fourth electrode, the voltages applied to the first electrode and the second electrode being controllable to have the same or different values.

2. Variable iris according to claim 1, wherein the ribs form the third electrode.

3. Variable iris according to claim 1, wherein both positively and negatively charged opaque particles are confined in the cell.

4. Variable iris according to claim 1, wherein at least one of the first transparent substrate and the second transparent substrate is covered with a dielectric layer.

5. Apparatus for reading from and/or writing to optical recording media, wherein it includes a variable iris according to claim 1.

6. Imaging apparatus, wherein it includes a variable iris according to claim 1.

7. Projection apparatus, wherein it includes a variable iris according to claim 1.

8. Method for operating a variable iris having a first transparent substrate and a second transparent substrate, which are separated by one or more ribs to form a cell confining charged opaque particles of a first sign, the first transparent substrate being provided with at least a first electrode and a second electrode both being adapted to be connected to a voltage source for acting on the charged opaque particles, and at least a third electrode and a fourth electrode adapted to be connected to the voltage source for acting on the charged opaque particles, the third electrode being arranged on the second transparent substrate or on the ribs and the fourth electrode being arranged on the second transparent substrate, the method having the steps of:

applying a voltage of the first sign to the second electrode and the first electrode;

applying a voltage pulse of an opposite sign to the third electrode, applying a voltage pulse of an opposite sign to the fourth electrode, and selectively applying a voltage of the opposite sign to either the first electrode or the second electrode.

9. Method according to claim 8, further having the step of subsequently applying voltage pulses of the opposite sign to further intermediate electrodes between the first electrode and the second electrode.

* * * * *